Reissued Feb. 20, 1923. Re. 15,543

UNITED STATES PATENT OFFICE.

WALTER K. BOILEAU, OF BALTIMORE, MARYLAND, ASSIGNOR TO PITTSBURGH OIL REFINING CORPORATION, A CORPORATION OF DELAWARE.

METHOD FOR TREATING BRAKE AND TRANSMISSION BANDS.

No Drawing. Original No. 1,418,695, dated June 6, 1922, Serial No. 555,388, filed April 18, 1922. Application for reissue filed January 13, 1923. Serial No. 612,556.

*To all whom it may concern:*

Be it known that I, WALTER K. BOILEAU, a citizen of the United States of America, residing in the city of Baltimore, State of Maryland, have invented certain new and useful Improvements in Methods for Treating Brake and Transmission Bands, of which the following is a specification.

This application is in part a continuation of my application No. 529,922, filed January 17th, 1922.

This invention relates to a method of treating transmission and brake bands of automobiles of the type which have a planetary transmission either in a separate case or in a case which forms part of the fly wheel casing which is in turn open to the crank case which latter description is in accordance with the construction of certain well known types of light, cheap, well known automobiles now in extensive use.

With the cylinder oils now in use which are pure petroleum oils of requisite specific gravities, flash point and cold test, the transmission bands become hard and brittle and acquire a glazed surface which causes them to alternately slip and grab giving the chattering and vibrating effect which is incident to the operation of most automobiles having the planetary type of transmission, particularly on low gear, reverse and on application of the foot brake in which three operations the three transmission bands are brought into play. This not only causes the operation of the brakes and gears to be variable and uncertain but greatly reduces the life of the bands.

The invention relates to a method of treating these bands in the ordinary operation of the car which keeps them soft and pliable so that they do not slip and grip and chatter and the operation of the brakes and gears is more forcible and certain. Further by eliminating this difficulty the life of the transmission bands is almost immeasurably extended as the wear to these bands is due almost entirely to the aforesaid alternate slipping and gripping of the bands when in operation. Wear and tear on the car is likewise reduced as chattering of the bands is destructive of all the connections from the transmission to the rear wheels particularly the rear axle and operating parts therein.

In the practice of the method which is the subject of my invention I treat the brake bands with a petroleum oil having the physical properties required of an internal combustion engine cylinder oil with which is combined a comparatively small percentage of saponifiable material, i. e., oil or grease which may be a vegetable oil or an animal oil, as sperm oil or lard oil, or the like. A grease which can be obtained in considerable quantities and which the applicant has found can be used to great advantage in this connection is a neutralized wool fat, i. e., the fat obtained in washing wool, the alkali being neutralized by the addition of an equivalent amount of acid.

It has been found by experiment that an advantageous combination consists of from 2% or 3% to 10% or 12% of saponifiable grease or oil, with the remainder comprising petroleum oil having the necessary physical properties required of internal combustion engine cylinder oils. One combination which has proved to be particularly good consists of 5% saponifiable oil or grease, with the remainder comprising a petroleum oil having the necessary physical properties required of internal combustion engine cylinder oils. The petroleum oils and the saponifiable oils or greases are solvents of each other and may be readily combined in any convenient manner.

In the practice of my method the transmission bands are bathed continually during the operation of the car in an oil containing saponifiable material combined as aforesaid, a bath composed of the mixed oil being for this purpose maintained in the transmission case which as aforesaid may be a single compartment with the fly wheel case and crank case or may be separate.

As the oil aforementioned serves with full efficiency as a motor lubricant my method is effective with any and all arrangements of the planetary transmission, the prime necessity being an enclosing case to hold the oil. When the bands are thus treated chattering is not only eliminated but the life of the bands is indefinitely increased.

Having thus described a method of treating transmission bands in accordance with my invention, I would have it understood that the specific terms herein are used de-scriptively rather than in a limiting sense, the scope of the invention being defined in the claims.

What I claim and desire to secure by Letters Patent is:

1. The method of treating brake and transmission bands of textile fabric used in connection with a planetary transmission to keep the bands soft and pliable which consists in maintaining in the transmission casing a bath consisting of a petroleum oil of substantially the consistency of internal combustion engine cylinder oil, combined with saponifiable material.

2. The method of treating brake and transmission bands of textile fabric used in connection with a planetary transmission to keep the bands soft and pliable which consists in maintaining in the transmission casing a bath consisting of a refined petroleum oil of the consistency used for internal combustion engine cylinder oil combined with 2 to 12 per cent saponifiable material.

3. The method of treating brake and transmission bands of textile fabric used in connection with a planetary transmission to keep the bands soft and pliable which consists in maintaining in the transmission casing a bath consisting of a refined petroleum oil of the consistency used for internal combustion engine cylinder oil combined with 2 to 12 per cent wool fat.

Signed by me at Baltimore in the city of Baltimore, this 10th day of January, 1923.

WALTER K. BOILEAU.